Patented Oct. 10, 1950

2,524,991

UNITED STATES PATENT OFFICE 2,524,991

PROCESS OF PREPARING SOYBEAN MEAL

Herbert Otto Renner, Des Plaines, Ill., assignor, by mesne assignments, to J. R. Short Milling Company, Chicago, Ill., a corporation of Illinois No Drawing. Application February 24, 1947, Serial No. 730,539

8 Claims. (Cl. 260—412.4)

1

This invention relates to new methods of preparing soya products for edible use, and more particularly has reference to the refining of particulate soybean products (e. g., flour, meal or flakes) by treatment with organic solvents to produce soy-protein food products of superior edible properties.

Because of its low cost and high nutritional value, especially in essential proteins, it is a generally recognized fact that the soybean is one of the best and cheapest sources of food energy in terms of calories per unit cost of production, provided it is consumed directly as human food rather than after conversion to meat in farm animals, as is the usual practice today. The greatest obstacle to the general use of soybeans as a source of human food products is the bitter taste and objectionable odor and color of such products when prepared by prior art methods. Another objection to soybean food products as heretofore produced is their poor keeping qualities and their tendency to rancidity in ordinary storage.

Despite the fact that the soybean has been an important source of food of Asiatic peoples for many centuries, all those well acquainted with the art of soybean processing seem to agree that natural, as contrasted to processed, soybean flour or meal is unacceptable to the American public as regards its palatability and flavor appeal. The very numerous attempts to improve the taste, flavor, odor and keeping qualities of soya products, dating from ancient Chinese history up to the present time, have met with but little success, when measured by modern standard food requirements, especially in the United States.

A study of the prior art, and in particular the patent literature, reveals that soya-refining methods suggested to date may be grouped, in conformity with the expressed aims, as follows:

I. Methods aiming at the removal or changes of unpalatable constituents and volatile flavoring or odoriferous substances of whole soybeans, by physical means, singly or in a great variety of combinations, such as heating, wetting, soaking or washing in water, pressure or vacuum-treatment, with inert protective coatings or inert gases as protection against oxidation during processing.

II. Methods aiming at improvements and modifications of odor and flavor with more or less complete deflavoring and deodorizing by chemical means, such as, oxidizing agents (hydrogen peroxide), reducing agents (formaldehyde, acetaldehyde-, protein-denaturing agents (ethylalcohol-vapors), neutralizing agents (ammonia vapors), acidifying agents (acids produced by fermentation), and metal (iron, calcium, magnesium)—salts for "fixing" (precipitating) soya constituents which were claimed to be responsible for undesirable flavor and odor.

III. Methods aiming at the neutralization of the bitter taste and natural odor by reacting soya's offensive principles with unknown principles contained in the aleurone particles of wheat, by milling together in presence of moisture.

IV. Methods aiming at the isolation of soy oil and lecithins from the soybean by solvent extraction at relatively high temperatures and producing more or less deodorized and deflavored extracted soybean meal as by-product. As the flavor of soybean meal obtained by commercial solvent extraction with hydrocarbons, such as hexane, is known to be unacceptable from the food-standpoint, only those extraction methods employing solvents such as absolute ethyl alcohol, known as protein-denaturing, as well as soybean-deodorizing and-deflavoring agents require consideration.

The above-cited methods of the prior art are generally so vague and indefinite as to leave to the reader's imagination the proper evaluation of such loosely employed terms as "debittering, deflavoring, flavor-improvements, purifying, flavor-refining, neutralizing of bitter taste and odor," and their application in practical use in which the yardsticks of technical chemical and organoleptic analysis may be applied by qualified analysts.

In contrast with the prior art, the most important objects of the present invention, as defined by measurable properties of the products obtained per se, or in combinations in which they are used, are as follows:

(1) Production of an edible soy-protein flour, the blandness of flavor and odor of which is characterized by the fact that the flavor and odor of food (such as bread, noodles, macaroni, breakfast foods, cookies), in which a substantial portion (e. g., 20–30%) of the wheat flour have been replaced by such edible soy-protein flour, make the detection of the latter's presence impossible.

(2) Production of an edible soy-protein flour in a yield and of a palatable flavor and odor not obtainable by any of the methods of the prior art.

(3) Production of edible and palatable soy-protein flours, preferably from solvent (hexane) extracted soymeal, which is a by-product of the commercial solvent-extraction of soybean-flakes, at ordinary temperatures, whereby is avoided the denaturing of proteins which results in lowered digestibility, lowered usefulness in baking, both commercial and private, lowered palatibility, lowered water-imbibing capacity and lowered solubility in chemical agents.

(4) Production of soy-protein flours having, in addition to the properties indicated under (1)

to (3) above, such low coloring power, particularly in the yellow and brown range, that acceptance by the consumer and the marketability of food products containing substantial portions of said flours will not be adversely affected.

(5) Production of soy-protein flours incorporating the properties mentioned under (1) to (4) above and in which oxidizing enzyme-complexes of the fat-peroxidizing type are inactivated or destroyed while urease-activity remains intact.

(6) Production, as a new article of manufacture, of a soy-protein flour of a protein-concentration permitting a substantial concentration of proteins in human foods, in the most direct way, and at the least expense.

With these and other objects in view which may be incident to my improvements, my invention consists in the combination and arrangement of elements and steps hereinafter described and illustrated in a general way in Table I.

*Table I*

| Raw materials used and originating in soybeans | Methods of using "Cellosolves" | Refined products aimed at— | By-products of unknown, partly known or potential value |
| --- | --- | --- | --- |
| 1 | 2 | 3 | 4 |
| Ia: Soybean-flakes or flour from whole (i. e., nonsolvent - extracted) enzyme-active soybeans. | (1a) Continuous or (1b) batch - extraction using varying ratios of solids/solvent. | (1) Odor - flavorless soy-flakes/meal with improved properties for human food. | (1) Cellosolve-soluble water-insoluble fractions of raw-material. |
| | (2) Wetting | (2) Improved soy-flakes/meal for preparation of protein of higher purity. | (2) Cellosolve-soluble water-soluble fractions of raw material |
| Ib: Soybean-flakes or flour of Ia solvent-extracted by known methods enzyme active or not. | (1a) Continuous or (1b) batch-extraction | (3) Soybean meal of selective enzyme-activity | (3) Cellosolve - insoluble fractions of soy oil |
| | (2) Wetting | | |

Column 1 of Table I discloses the raw materials used in my process while columns 2 and 3 represent principal flow sheets of the various methods of processing according to my invention. The arrows indicate at a glance the purpose of each individual method (column 2), with regard to the refined products arrived at (column 3), and the nature of the by-products obtained (column 4).

The general term "Cellosolves," appearing at the top of column 2 of Table I and elsewhere in this application, includes both "methyl Cellosolve," (2-methoxy ethanol or glycol monomethyl ether), and "ethyl Cellosolve" (2-ethoxy ethanol or glycol monoethyl ether). For brevity in the following, the general term "Cellosolve" is used in lieu of the longer and more explicit chemical identification. While most of the results disclosed in this application were obtained by employing methyl Cellosolve, it was found that substantially the same results were obtained by the use of "ethyl Cellosolve," but the former is preferred on account of its lower boiling point, particularly where low temperature vacuum distillation or evaporation were the only means permissible for the removal of all traces of solvent from the product (such as soybean meal). For the same reasons (high boiling points) butyl and benzyl Cellosolve, while ordinarily included in the general term "Cellosolve," were not used as solvents in the processes herein disclosed and although they might theoretically be so employed, their commercial usefulness for this purpose appears negligible.

To clearly distinguish from the prior art and for general clarity and brevity, certain special terms and abbreviations will be used in this application, with the following definitions:

The term "soybean meal" includes any type of soybean particulate material obtained by breaking down whole soybeans into flakes and flours of any desired particle size which for practical reasons are preferably freed from most of their oil by well-known solvent-extraction methods (such as extraction with hexane). Meal or flakes from whole soybeans, and hydrocarbon (hexane)-extracted soymeal or flakes (so-called "white flakes" of commerce), are both suitable raw materials and yield products of the same basic properties when submitted to low temperature-extraction with methyl or ethyl Cellosolve. However, the use of "white flakes" as raw material is preferred as it offers important technical advantages over the use of whole soybean flakes, as will hereinafter appear.

The term "Cellosolve-refined soybean meal" (abbreviated "CRS") is used to denote a soymeal or soy-protein flour prepared by the methods disclosed in this application and possessing all of the properties cited as objects of this invention.

Methyl Cellusolve is abbreviated: "m-Cel".

The term "Skellysolve" refers to a series of petroleum naphtha solvents commonly employed in industry for extraction purposes.

The following examples serve to illustrate the several processes of the present invention:

*Example I*

Batch as well as continuous solvent-extraction systems are suitable for the purposes of this invention, although the fact that non-fatty solids are removed from the soybean by m-Cel would undoubtedly require certain modifications in the variety and sequence of operations employed commercially in certain continuous extraction systems, such as those of Bollman, Hilderbrandt or Allis-Chalmers, etc., which employ the preferred principle of leaching resting soybean flakes with circulating solvent. The results herein disclosed have been obtained with the aid of the principle of continuous-counter current flow of m-Cel solvent through resting columns of soybean flakes. A battery of "$n$" vertical columns filled with the soybean flakes to be extracted is connected in such a way that solvent, fed to the top of the first column, after having replaced all air between, and completely immersing said flakes, at a predetermined rate, syphons over or is pumped to the top of the second column, similarly from the bottom of the second to the top of the third column, and so on to the top of the $n$th column. From the bottom of the $n$th column, the extract is fed to a freshly filled column introduced into the system instead of column 1, the solids contents of which are removed. The solvent thus flows in successively through the resting solids and becomes progressively enriched in the soluble constituents of the said soy-flakes until it finally leaves the last column of the system in a relatively concentrated form. The ratio of the weight (grams) of soy-flakes representing the charge of a single extraction-column to the volume (cc.) of solvent passing through said column before the charge of extracted soy-flakes is removed, will be referred to hereinafter as "extraction ratio g./cc.". It is readily seen that after the system of columns has once been initially filled with solvent and after the charge of C (grams), in the first column has been extracted on the basis of the ratio $$\frac{g.}{cc.} = \frac{1}{10}$$

with 1000 vol.-parts for example, the extracted soyflake-solids, removed regularly from the system after each 1000 cc. of fresh solvent fed to the most-completely extracted column, are actually extracted on the basis of the extraction ratio of $1:10 \times n$ wherein $n$ represents the total number of columns in the system. As extraction ratios of 1/20 have been found to be more than sufficient to accomplish the desired results from the standpoint of flavor-refined soyflour it follows that system comprising a minimum of $$n = \frac{20}{10} = 2 \text{ columns}$$

for continuous extraction would be practically feasible.

Employing one to four column-systems of the above type for extracting commercial soyflour as well as flakes from whole soybeans with m-Cel at ordinary temperatures, the amounts as well as the qualitative characteristics of the extractions removed from the soybean material were found to vary considerably with variations of the extraction-ratios, as shown by way of example in Table II.

One of the most outstanding disadvantages of this method is the impossibility to produce, in a single operation, under practical conditions, Cellosolve-refined soyflour (CRS) with an oil content lowered sufficiently to forestall rancidfiication and odor and flavor deterioration during storage. The above and additional disadvantages originate in the fact that due to the selectivity of the solvent towards soy oil and soy lecithin fractions, no clear cut, pure phases are obtained, such phases offering great difficulties should isolation of pure oil or lecithin phases be attempted. In spite of the handicaps of this method, it should be emphasized, though, that the oil-free CRS resulting from it has all of the desirable properties displayed by CRS produced from solvent (hydrocarbon)-extracted soymeal, according to Examples II to IV cited below.

In contrast thereto, Examples II to IV, demonstrate the simplification of the extraction methods disclosed in Example I by the use of soymeal which has been substantially freed of oil by commercial hydrocarbon (hexane)-extraction, as starting material.

In Examples II and III, I have characterized and evaluated the quality of the resulting improved soybean meals not only by the latters' properties (such as nitrogen content, color, odor and flavor) but also by the properties and quantities of by-products removed from the soybean by Cellosolve-extraction.

*Table II*

| Extraction-ratio, g./cc. Type of soy | m-Cel-Soluble fraction removed | | Fractions of E (Column 2) obtained by re-extraction with hydrocarbons (Skellysolve) | | Properties of m-Cel-extracted Soy |
|---|---|---|---|---|---|
| | in Per cent of Soy, E% | Properties | Skellysolve | | |
| | | | Insoluble fraction | Soluble fraction | |
| 1 | 2 | 3 | 4 | 5 | 6 |
| #1 — 1/1 flakes | Per cent 4.25 | very hygroscopic solid taste: trace sweetish, rather bland. | very hygroscopic solid, as E; contains 0.57% nitrogen; practically free of oily matter. | practically none. | Contains 21% of Skellysolve soluble matter. |
| #2 — 1/0.75 flakes, 4 column system. | 4.3 | solid as above; taste strong soybeany insoluble in 96% alcohol. | about 75% of E equivalent to 3.2% of flakes. Solid as under #1, contains 0.62% N₂. | about 25% of E equivalent to 1.1% of flakes, yellow-brown salve-like, not readily soluble in alcohol, lard. | Contains crude oil. |
| #2a — 1/5 flakes, as #2 | 12.3 | mushy-oily-pasty mass. | about 56.2% of E equivalent to 6.9% of flakes, mild soy-taste, properties as under #2: contains 0.58% N₂. | about 43.8% of E equivalent to 5.4% of flakes mobile turbid, yellow oil. | Do. |
| #2b — 1/9.1 flakes, as #2 | 17.5 | very mushy-oily mass. | about 50.8% of E equivalent to 8.9% of flakes, very light sweetish taste, brownish color; forms oily phase on standing by m-Cel. | about 49.2% of E equivalent to 8.6% of flakes, turbid, yellow oil. i. e. only 44.5% of 19.3% total of oil in flakes removed by m-Cel. | Contains 10.7% of oil removable with hydrocarbons. |
| #3 — 1/12 very slow extraction, soy-flour, 4 column system. | about 30 | mushy-pasty, separating into oily and solid phase. | about 48% of E equivalent to 14.4% of flours; slightly sweetish tasting, well-colored solid. | about 52% of E equivalent to 15.6% of flour; oil showing solvent-power towards non-oily solids (column 4). | Still contains oil requiring removal. |
| #4 — 1/10 flakes 1 column system. | about 16.3 | decidedly oily solid. | after 5 hrs. refluxing with about 62% of E equivalent to 9.8% of flakes; dry, colored solid containing 0.67% N₂. | Skellysolve: about 38% of E equivalent to 6% of flakes pasty-oily solid, dark yellow color. | Contained 14.5% of Skellysolve-soluble matter. |
| #5 — 1/? (very high). Refluxing at ordinary temperature for 14 hrs. soy-flour. | ? | contained about 75% of total oil of soy-flour. | | | Contained still 3% of Skellysolve-soluble oil (by refluxing). |
| #6 — 1/?% (very high). Refluxing with boiling m-Cel soy-flour. | ? | Scorched, contains all oil of soy besides non-oily solids. | | | Scorched, discolored, free of oil. |

Example II

A quantity of 1204 grams (or 1127 grams on a dry basis) of so-called "white-flakes," representing soy-flakes suitable as raw material for commercial protein-extraction, freed of their extractable oil and other soluble soy fractions (lecithins etc.,) by hydrocarbon (hexane)-extraction and containing 6.4% moisture and 5.94% ash and 8.41% (94.78 grams) nitrogen on moisture-free basis, were extracted with commercial m-Cel, the pH of which in water usually is found to be slightly below 7.0 (around 6.6), in a four-column system described in Example I, at ordinary temperatures (23.8°–31.6° C.=75–85° F.)

at a rate of about 6% (by weight of flakes) of solvent per minute (i. e., with about 72 cc. of m-Cel per minute) until the extraction ratio g./cc.=1/7.4 had been reached.

The m-Cel-insoluble soy-flake-residue was freed of the adhering solvent by well-known suitable means (such as suction or centrifuging dry and vacuum-drying at moderate temperatures) assuring optimal recovery and minimal loss of solvent. The thus recovered 1092 grams of air-dry residue had perfectly bland odor and flavor not suggesting any soybean-origin, showed greatly improved color in contrast to the original "white flakes" and contained 9% moisture and 9.48% nitrogen on dry basis; i. e., 983 grams (equivalent to 87.2% of dry white flakes) of dry matter with 93.2 grams of nitrogen, equivalent to 98.3% of the total of 94.78 grams nitrogen contained in 1127 grams of moisture free "white flakes."

In view of the fact that prior art and scientific literature so far failed to place emphasis upon the characterization of those undesirable factors or constituents of soybeans, the only proof of the presence of which can be traced solely to human instinctive appetite, the properties of the m-Cel soluble fraction appear of importance in evaluating the degree of soybean-meal-refining achieved by the foregoing method.

The m-Cel soluble fraction obtained after removal of the solvent in vacuo at about 65.5° C. (150° F.), equivalent to 11.8% of moisture-free "white flakes" (1127 grams), contained 0.65% (=0.86 grams) of nitrogen equivalent to 0.91% of the total nitrogen contained in the original "white flakes." The material, a brittle, glassy-spongy hygroscopic solid, is of dark yellow-brownish color and has a peculiar soybeany odor and very unpleasant strong adhering soybeany flavor which is obviously largely responsible for the non-acceptance of soybean-food products. Storage of this material at ordinary temperatures in closed container in air failed to modify odor and flavor. It appears important to point out that the odor and flavor constituents of this material appear to be non-volatile in vacuo at temperatures up to about 100° C. and exceedingly stable towards oxidation in air in spite of the fact that acetone-extraction of it removed a very small amount of oily matter while freeing it from all objectionable odor and flavor and brown color. The difference between the total nitrogen present in original flakes (94.78 grams) and the 93.2+0.86=94.06 grams nitrogen recovered in insoluble and soluble fractions is believed due to losses of volatile $N_2$-compounds during vacuum-distillation.

Example III

This example illustrates the m-Cel extraction of 4500 grams of hexane-extracted "white flakes" in a single column-extraction system, at a ratio of g./cc.=1/5.2, at ordinary temperatures, similar to Example II. In contrast to the latter example, in order to simulate commercial conditions, a fixed amount, about 25% of the total solvent to be passed through the flakes, is used in rotation over and over again by returning the solvent recovered from extracts by vacuum-distillation directly to the top of the extraction column. To demonstrate the degree of color refining of "white flakes" accomplished by the method, the coloring matter removed during the extraction with m-Cel was quantitatively measured as follows. By colorimetrically matching the colors of all extracts collected against an arbitrary 0.2% potassium bichromate solution, the total amount of this solution equivalent in color intensity to all of the coloring matter removed from 4500 grams of white flakes containing 6.4% moisture with 25.2 liters of m-Cel was found to be 28.596 liters of 0.2% $K_2Cr_2O_7$.

Table III shows the relationship between varying extraction ratios and the degree of color refining and removal of m-Cel-soluble solids.

Table III

| Extraction-Ratio, g./cc. | Coloring matter removed by solvent in per cent of total | m-Cel-soluble solids removed in per cent of total |
|---|---|---|
| | Removed using 1/5.2 ratio | |
| | Per cent | Per cent |
| 1/0.4 | 11.7 | 28.1 |
| 1/0.97 | 19.2 | 50.9 |
| 1/1.5 | 51.6 | 63.3 |
| 1/2.1 | 72.6 | 71.4 |
| 1/2.7 | 96.0 | 79.5 |
| 1/3.2 | 97.0 | 84.3 |
| 1/4.5 | 99.0 | 95.2 |
| 1/5.2 | 100.0 | 100.0 |

Table III discloses the highly important fact that while 96% of the total coloring matter removed by employing the extraction ratio 1/5.2 was already dissolved when the extraction ratio 1/2.7 was reached, the amount of m-Cel-soluble solids removed simultaneously increased at a fairly uniform rate to a total minimum of 14.4% by weight of moisture free white flakes initially used. The further fact that a very satisfactory odor and flavor refining of soymeal can be readily obtained by a short washing of the latter with m-Cel, but cannot be accomplished by a mere wetting of the meal with solvent and drying in vacuo at increased temperatures, points to the possibility of obtaining in cases where the removal of m-Cel-soluble solid fractions appears undesirable or unnecessary, the desired degree of odor and flavor and color-refining by employing very low extraction ratios, such as 1/2.7. As the removal of such a large amount of pigments from commercial soymeal must result in products of superior color and substantially decreased coloring power in admixture with other materials such as wheat flour, the introduction of the term "Coloring power" as a novel criterion of quality for soybean meal appears well justified.

Again, as in Example II, the m-Cel-insoluble soy residue recovered, on a dry basis, at the rate of 84.5% by weight of moisture-free white flakes initially used, shows a noticeable increase of 1.31% in nitrogen content and in ash content from 5.94% to 6.28%, while the m-Cel-soluble solids recovered in vacuo, and amounting to 14.4% by weight (3563 grams) of dry white flakes, contained an average of only 0.63% nitrogen, i. e., removed nitrogen from the latter in an amount equivalent on moisture-free basis to only 0.089% by weight of the said flakes, or to 1.0% of the total nitrogen originally contained therein.

The m-Cel-insoluble soy residue of Example III has essentially the same desirable properties as that resulting from Example II, as regards odor, flavor, color and coloring power.

*Example IV*

This example finally serves to demonstrate the feasibility of employing for extraction purposes a m-Cel the pH of which is, with very small quantities, for example, of $$\frac{N}{10}$$

sodium hydroxide adjusted to neutral 7.0 before re-entering the one column-system after recovering from the extracts. This method appears of importance in view of the fact that the pH of extracts ranged from 5.4–5.8, while the pH of the solvent recovered by vacuum-distillation was around 6.6 which indicates that the solvent-soluble fractions (such as those in Examples II or III, respectively) are definitely of acidic character while a pure solvent showing pH 7.0 cannot be recovered by distillation. Neutralization thus deliberately avoids the accumulation of acidity and its probable influence upon acid-reactive soymeal-constituents and their solubilities in the solvent, during the rotation of the solvent in the extraction system, such as depicted in Example III. The quantities of $$\frac{N}{10}$$

NaOH required for neutralizing the solvent m-Cel, used over and over again, when employing an extraction-ratio of g./cc.=1/11 for 5200 grams of the hexane-extracted soy flakes containing 6.3% moisture, (i. e., 4872.4 grams of dry matter), and on dry basis 6.19% ash and 8.67% nitrogen, amounted to about 4 cc. per 3.8 liters of recovered solvent at the beginning and gradually climbed to about 9 cc. per gallon when the extraction was stopped and a total of 57.3 liters had passed through the system. This neutralization-procedure noticeably affected the properties of the m-Cel-soluble fractions regained as residues from the filtrates by vacuum-distillation. A comparison of the 14.0% yield of m-Cel-soluble fractions (by weight of moisture-free soy flakes initially used) with the 14.4% yield of the same in Example III indicates that the high (1:11) extraction ratio employed in Example IV is not required to produce optimal quality-refining of "white flakes." Similar to the results of Example III, the m-Cel-insoluble soy residue, after removal of all solvent at ordinary temperatures, showed, on dry basis, a 1.13% increase in nitrogen content (from 8.67% to 9.80%) and a 0.27% increase in ash content (from 6.19% to 6.46%). The m-Cel-insoluble soy residue represented a soybean flour of excellent neutral flavor and odor far superior in any respect for food purposes to the original extracted soy flakes from which it was prepared, as well as to any known commercial soy flours.

In view of the fact that those skilled in the art seem to agree that the first desirable step in establishing soybeans in the diet of non-orientals is to remove their characteristic objectionable odor and taste so as to yield a substantially odorless and a bland-tasting product, properties of the m-Cel-insoluble soy residues of Examples II, III and IV, meet the desired requirements and disclose the possibilities of the CRS as food.

Further desirable properties of the Cellosolve-refined soy-flours (CRS), obtained by the foregoing methods, and not found in preparations heretofore offered in commerce include:

(1) Far-reaching freedom from more or less colloidal fractions responsible for the typical sliminess of doughs formed from ordinary soy-flours with water and the lowered water absorption of ordinary soy-flours.

(2) Freedom from substances, soluble in Cellosolves, which suffer ready discoloration (browning) due to caramelization and decomposition with formation of odoriferous substances under the influence of heat, as a consequence of which CRS may be submitted to heat-treatments (such as employed to improve digestibility of soy-proteins) which would roast ordinary soy-flours and impart undesirable odor and flavor characteristics to the latter.

(3) The oxidizing enzyme-complexes of the fat-peroxidizing type are inactivated or destroyed while urease activity remains intact.

(4) Exceptionally high protein contents as shown in the following Table IV wherein the analyses of the two samples of alcohol-extracted soy flakes are given for comparison:

*Table IV*

| Sample of soy | Nitrogen on dry basis, Per cent | Protein—Equivalent on dry basis | | Ash content on dry basis, Per cent |
|---|---|---|---|---|
| | | $N_2 \times 5.7$ Per cent | $N_2 \times 6.02$ Per cent | |
| Commercially extracted "White" Flakes. | 8.41 | 47.94 | 50.63 | 5.94 |
| | 8.67 | 49.42 | 52.19 | 6.19 |
| Ethyl alcohol extracted Soyflakes (Northern Regional Lab.). | 9.45 | 53.86 | 56.89 | 6.33 |
| | 9.55 | 54.49 | 57.49 | 6.27 |
| Methyl - Cellosolve - extracted "White Flakes" (containing hulls) | 9.72 | 55.40 | 58.51 | 6.28 |
| Do | 9.80 | 55.86 | 59.00 | 6.46 |
| Methyl - Cellosolve - extracted "White Flakes" (hulls removed by sifting from No. 4.) | 10.27 | 58.54 | 63.67 | 6.70 |

The following examples serve to illustrate the practical usefulness of CRS as valuable ingredient of food products for general nutritional use, such as bread and dough products like macaroni, noodles, spaghetti, etc.

The herein disclosed methods of making soy-flour palatable and nonobjectionable, when used in blends with other customary cereals and food products of the non-Asiatic world, appear of commercial and social importance. On the other hand, in order to make the nutritional values of soybean flours in general, and CRS in particular, of significant value in the diet of a people, it must be concluded that wheat flour replacements in bread not even reaching 10% of the latter, while not insignificant from the nutritional standpoint, remain inadequate to round out a diet dangerously short of essential proteins.

In contrast thereto, it has been established as a fact that the odor and flavor of wheat flour bread containing 20% of methyl Cellosolve-refined soy-flour does not suggest any presence of soybean flour. There is no doubt that by abandoning the spongy, blown-up wheat flour loaf as the standard bread of today, a highly nourishing and palatable soybean bread, based upon the use of CRS and setting its own standard in all respects, could be developed without difficulty and without fundamental departure from customary commercial baking procedures.

In contrast to bread, dough products, such as macaroni and noodles, do not offer any difficulties if CRS is used to replace a rather high percentage of wheat flour. For example, egg noodles prepared as a stiff dough according to the following formula:

450 pts. (by weight) of wheat flour
150 pts. (by weight) of refined soy-flour Example III
126 pts. (by weight) of whole fresh eggs (containing 93 grams water) and
150 pts. (by weight) of water The dough is handled in accordance with established practices and finally dried after rolling out and cutting into strips. The resulting noodles, air-dry, contained 4.1% nitrogen equivalent to a minimum of 23.3% protein. For comparison the best grade of fresh roast beef with 59% moisture contains on an average 4.1% nitrogen, equivalent to 25.9% protein. Cooking and tasting tests by qualified judges revealed that the soy-flour contained in said noodles could not be detected by taste and that the soy-flour noodles had an even fuller taste, giving the impression that they were richer with regard to food-value and that they represented a more complete meal. One and a half years of storage did not impair the odor and flavor of the air-dry noodles; they cooked and held their shape satisfactorily.

The invention has been disclosed herein for illustrative purposes in its preferred embodiment, but it is to be understood that the scope of the invention is defined by the appended claims rather than by the foregoing description.

What I claims is:

1. A process of refining soybean meal from which its oil has been largely removed by extraction with hexane which process comprises the extraction of said meal with a second extraction material selected from a group of solvents consisting of glycol monomethyl ether and glycol monoethyl ether, and removing said solvent with material extracted thereby.

2. A process of refining soybean meal from which its oil has been largely removed by extraction with hexane which process comprises dissolving with a solvent selected from a group of solvents consisting of glycol monomethyl ether and glycol monoethyl ether at ordinary temperatures those fractions of said meal which are soluble in said selected solvent, and removing said fractions from the solid residue by centrifuging and subsequent vacuum drying at moderate temperatures.

3. A process of refining soybean meal from which its oil has been largely removed by extraction with hexane which process comprises dissolving with a solvent selected from a group of solvents consisting of glycol monomethyl ether and glycol monoethyl ether at ordinary temperatures those fractions of said meal which are soluble in said selected solvent, and removing said fractions from the solid residue by centrifuging and subsequent vacuum drying at moderate temperatures, whereby the fat-peroxidizing enzyme-complexes of said meal are inactivated while their urease activity remains intact.

4. A process of preparing edible and palatable soybean meal of high protein content characterized by extracting meal or flakes from whole, enzyme-active soybeans at ordinary temperatures by a first extracting material consisting of hexane, and thereafter further subjecting said soybean solid material to a second extraction material selected from glycol monomethyl ether and glycol monoethyl ether at ordinary temperatures, and removing said second extraction material and materials dissolved therein and which contain unpalatable and chemically unstable constituents of the soybean by centrifuging and subsequent vacuum drying at moderate temperatures, whereby the palatability and chemical stability of the product is increased, and the protein content is maintained.

5. A process of refining soybean meal from which its oil has been largely removed by extraction with hexane which process comprises dissolving with a solvent selected from a group of solvents consisting of glycol monomethyl ether and glycol monoethyl ether and in reaction ratios of from 1/1 to 1/12 at ordinary temperatures those fractions of said meal which are soluble in said selected solvent, and removing said fractions from the solid residue by centrifuging and subsequent vacuum drying at moderate temperatures.

6. A process of refining soybean meal from which its oil has been largely removed by extraction with hexane which process comprises dissolving with a solvent selected from a group of solvents consisting of glycol monomethyl ether and glycol monoethyl ether in an extraction ratio of approximately 1/2.7 at ordinary temperatures those fractions of said meal which are soluble in said selected solvent, and removing said fractions from the solid residue by centrifuging and subsequent vacuum drying at moderate temperatures.

7. A process of refining soybean meal from which its oil has been largely removed by extraction with hexane which process comprises the extraction of said meal with a second extraction material selected from a group of solvents consisting of glycol monomethyl ether and glycol monoethyl ether, the pH of which is constantly maintained at neutral, whereby is avoided the accumulation of acidity in the solvent and its adverse influence upon acid-reactive soy-meal constituents.

8. A process of refining soybean meal from which its oil has been largely removed by extraction with hexane which process comprises the extraction of said meal with a second extraction material selected from a group of solvents consisting of glycol monomethyl ether and glycol monoethyl ether which is adjusted to neutral pH, and removing the soluble fractions thus extracted from the residue by centrifuging and subsequent vacuum drying at moderate temperatures.

HERBERT OTTO RENNER.

REFERENCES CITED

The following references are of record in the file of this patent:

UNITED STATES PATENTS

| Number | Name | Date |
|---|---|---|
| 1,260,656 | Bollman | Mar. 26, 1918 |
| 2,191,455 | Davis | Feb. 27, 1940 |
| 2,200,391 | Freeman | May 19, 1940 |
| 2,230,738 | Jenkens | June 11, 1943 |
| 2,377,975 | Singer | June 12, 1945 |
| 2,309,528 | Freeman | Dec. 11, 1945 |

OTHER REFERENCES

Satow, Researches on Oil and Proteid Extraction from Soybean, 1921, pages 23 and 26.